United States Patent
Klement et al.

(10) Patent No.: US 12,513,318 B2
(45) Date of Patent: *Dec. 30, 2025

(54) METHOD AND SYSTEM FOR ENCODING IMAGE DATA REPRESENTING A GEOGRAPHICAL LINE

(71) Applicant: BAREWAYS GMBH, Lübeck (DE)

(72) Inventors: Sascha Klement, Lübeck (DE); Florian Hartmann, Lübeck (DE); Stefan Matlage, Lübeck (DE)

(73) Assignee: BAREWAYS GMBH, Lubeck (DE)

( * ) Notice: Subject to any disclaimer, the term of this patent is extended or adjusted under 35 U.S.C. 154(b) by 463 days.

This patent is subject to a terminal disclaimer.

(21) Appl. No.: 17/997,897

(22) PCT Filed: Jun. 30, 2021

(86) PCT No.: PCT/EP2021/068070
§ 371 (c)(1),
(2) Date: Nov. 3, 2022

(87) PCT Pub. No.: WO2022/042906
PCT Pub. Date: Mar. 3, 2022

(65) Prior Publication Data
US 2023/0353763 A1    Nov. 2, 2023

(30) Foreign Application Priority Data
Aug. 24, 2020   (DE) ............... 10 2020 122 052.9

(51) Int. Cl.
*H04N 19/33*        (2014.01)
*G01C 21/00*        (2006.01)
(Continued)

(52) U.S. Cl.
CPC ......... *H04N 19/33* (2014.11); *G01C 21/3852* (2020.08); *G06T 3/403* (2013.01);
(Continued)

(58) Field of Classification Search
None
See application file for complete search history.

(56) References Cited

U.S. PATENT DOCUMENTS

| 6,694,064 B1 | 2/2004 | Benkelman |
| 2005/0102101 A1 | 5/2005 | Beesley et al. |

(Continued)

FOREIGN PATENT DOCUMENTS

| CN | 108305277 | 7/2018 |
| DE | 102004038740 | 2/2006 |

(Continued)

OTHER PUBLICATIONS

Cadamuro et al. "Assigning a Grade: Accurate Measurement of Road Quality Using Satellite Imagery," arXiv:1812.01699v2, Dec. 2018, 5 pages.

(Continued)

*Primary Examiner* — SJ Park
*Assistant Examiner* — Caroline E. Depalma
(74) *Attorney, Agent, or Firm* — Sheridan Ross P.C.

(57) ABSTRACT

The invention relates to a method of encoding image data representing a geographical line, GL, or its surroundings, and a data processing system being configured to perform the encoding. The method comprises applying a data compression process to reduce the spatial resolution of a given image represented by the image data. Specifically, the image may form an imagery layer of an imagery stack comprising various imagery layers, each imagery layer representing an individual image, e.g. of a same geographical region. The data compression process comprises: generating two or more sublayers of the image by resampling at least one region of the image at a respective lower spatial resolution than its original spatial resolution, while maintaining or resampling the spatial resolution of at least one other region (Continued)

of the image such that, when the sublayers are overlapped to jointly define a combined multi-resolution representation of the image, the average resolution of the combined multi-resolution representation is lower than the original resolution of the image.

20 Claims, 6 Drawing Sheets

(51) Int. Cl.
G06T 3/403 (2024.01)
G06V 20/13 (2022.01)
H04N 19/105 (2014.01)
H04N 19/132 (2014.01)
H04N 19/136 (2014.01)
H04N 19/167 (2014.01)
H04N 19/172 (2014.01)
H04N 19/182 (2014.01)

(52) U.S. Cl.
CPC ........... *G06V 20/13* (2022.01); *H04N 19/105* (2014.11); *H04N 19/132* (2014.11); *H04N 19/136* (2014.11); *H04N 19/167* (2014.11); *H04N 19/172* (2014.11); *H04N 19/182* (2014.11)

(56) References Cited

U.S. PATENT DOCUMENTS

| | | | |
|---|---|---|---|
| 2007/0014488 A1 | 1/2007 | Chen et al. | |
| 2008/0133132 A1 | 6/2008 | Jung | |
| 2010/0266161 A1* | 10/2010 | Kmiecik | G06T 5/30 382/113 |
| 2014/0125655 A1 | 5/2014 | Kunath | |
| 2015/0206025 A1 | 7/2015 | Chen et al. | |
| 2017/0084037 A1 | 3/2017 | Barajas Hernandez et al. | |
| 2017/0287170 A1* | 10/2017 | Perona | G06V 20/56 |
| 2018/0261007 A1* | 9/2018 | Stacey | G06T 9/00 |
| 2019/0156566 A1* | 5/2019 | Chen | G06T 19/20 |

FOREIGN PATENT DOCUMENTS

| | | |
|---|---|---|
| EP | 0987823 | 3/2000 |
| EP | 2725323 | 4/2014 |
| EP | 3486608 | 5/2019 |
| WO | WO 2017/106424 | 6/2017 |
| WO | WO 2018/061010 | 4/2018 |

OTHER PUBLICATIONS

International Search Report and Written Opinion for International (PCT) Patent Application No. PCT/EP2021/068070, dated Nov. 11, 2021, 13 pages.

Written Opinion of the International Preliminary Examining Authority for International (PCT) Patent Application No. PCT/EP2021/068070, dated Jul. 22, 2022, 10 pages.

International Search Report and Written Opinion for International (PCT) Patent Application No. PCT/EP2021/068044, dated Nov. 16, 2021, 17 pages.

Written Opinion of the International Preliminary Examining Authority for International (PCT) Patent Application No. PCT/EP2021/068044, dated Jul. 25, 2022, 11 pages.

Official Action for U.S. Appl. No. 17/997,899, dated Feb. 20, 2025 7 pages.

\* cited by examiner

METHOD AND SYSTEM FOR ENCODING IMAGE DATA REPRESENTING A GEOGRAPHICAL LINE

CROSS REFERENCE TO RELATED APPLICATIONS

This application is a national stage application under 35 U.S.C. 371 and claims the benefit of PCT Application No. PCT/EP2021/068070 having an international filing date of 30 Jun. 2021, which designated the United States, and which PCT application claimed the benefit of German Patent Application No. 10 2020 122 052.9 filed 24 Aug. 2020, the contents of each of which are incorporated herein by reference in their entireties.

The present invention relates to the field of image processing. Specifically, the invention relates to a method and system for encoding image data representing a geographical line, e.g. a transport line—such as a road, particularly an unpaved road, or a railway—or a border line. The encoded image data may particularly be used as a basis for extracting and classifying features from the image data to classify and monitor conditions along geographic lines.

Prominent examples of land-based transport lines, which can be found in virtually every country of the world, are roads. Specifically, the majority of roads worldwide is unpaved. While official numbers are available only for a few countries, overall estimates go up to 80%. Although this percentage negatively correlates with the development status of a particular country, even in some of the wealthiest and most developed countries a significant number of roads is unpaved.

The current condition of such unpaved roads depends heavily on the current season and weather, vegetation, and frequency of usage. Snow, ice, floods, landslides and continuous exposure to vehicles and heavy trucks may render these roads impassable for months. Even though there may be much less traffic on these roads, the risk of accidents is much higher than in urban areas. However, these transport lines are also essential as 50% of the world's population lives along such roads. Their quality is a performance indicator for economic development and an enabler for tourism and infrastructure accessibility for remote communities to hospitals, schools and markets.

While unpaved roads are most susceptible to the aforementioned issues, other transport lines, in particular paved roads, may also be affected by issues such as aging of asphalt, potholes, geologic phenomena and overgrowing vegetation that requires hard-to-predict maintenance work and may cause costly delays or damages and may even cost lives, e.g. if insufficiently maintained bridges collapse. At least some of these issues may also be relevant for other transport lines, e.g. railway tracks or water transport lines along rivers, pipe-lines or power lines.

Referring again to roads as non-limiting examples of geographical lines, the assessment of road surface quality and its surrounding space in rural regions has several additional degrees of complexity when compared to metropolitan areas.

First of all, it is noted that these roads are usually less frequently used than metropolitan streets and roads or major highways. Moreover, monitoring systems relying on a quality assessment on the ground with regular updates are typically not feasible for technical or economic reasons. Technical equipment, staff and funding limit road maintenance activities to actions taken after particular disasters, accidents or involve long-term infrastructure planning. Thus, in the foreseeable future, up-to-date information collected "on the ground" will likely not become available for most rural transport lines, in particular for unpaved roads, due to the nature of the problem.

Secondly, the quality of road surface assessment heavily depends on the analysis of historic data, i.e. for the assessment of the current condition it is important to know how much precipitation a region of interest received over the last hours, days, or weeks. Besides the amount of precipitation (rain, snow, any combination thereof), other weather parameters such as temperature and wind may cause road quality degradation or long-term erosion issues.

Thirdly, the quality and condition of a road is not only affected by what is present directly on the drivable road surface, but is also influenced by shape, condition and events near the road such as overgrowing vegetation, landslides, avalanches, rockfalls, or flash floods. Some of these issues have a very local scope in the range of meters—such as the shape of the road shoulder or the amount of vegetation besides the road—while others may have a scope of several kilometers such as disastrous landslides or floods. Thus, systems for deriving the current state and situation on particular road segments will typically include data from a wider spatial scope in order to be able to give any reliable information.

Usage of multi-spectral satellite imagery ranges from countless civil applications like geographic mapping, city planning, precision farming, traffic management to pollution monitoring and climate change analysis. Currently, i.e. in 2020, medium resolution satellite systems typically provide imagery data at a resolution of up to 10 m×10 m per pixel with a revisit time between 3 and 6 days (e.g. Copernicus Sentinel 2 operated by the European Space Agency), while very high resolution systems typically provide a resolution of up to 30 cm×30 cm per pixel. Even higher resolutions can be obtained from aerial imagery acquired from drones or airplanes. Medium resolution imagery allows for detecting and classifying roads and vegetation, while high resolution systems can even resolve lane markings and individual trees.

In general, satellite operators provide data as orthorectified imagery. Therefore, they trans-form raw image data to account for topographical variations of the surface of the earth and the tilt of the satellite or aerial sensor that was used to acquire the image. Satellite imagery typically provides intensity values for the visual spectrum (red, green and blue), but often other spectral components are included that are not visible to humans but still allow to gain information about the observed region (e.g. infrared and radar). Land cover classes such as "urban", "vegetation" or "water" each have a characteristic spectral response and accordingly, indexes, such as the Normalized Difference Vegetation Index (NDVI), have been developed to standardize related analysis. Such indexes aggregate spectral information from different bands to simplify assessment of features on the ground.

Satellite imagery has been used excessively to classify land cover and vegetation for precision farming or climate change analysis. Known methods for analyzing such satellite imagery have in common that they are based on classic rectangular raster images observing the earth from above as a contiguous region. Preprocessing techniques might be applied to account for tilt of the satellite, atmospheric distortions or elevation with the aim of reducing image distortion and other image artifacts as well as possible. Thus, each pixel in the image represents features as if they were seen by a camera from directly above (zenith).

Typically, these images are geo-referenced, i.e. their pixels are aligned to and expressed in relation to a geographic coordinate system, e.g. in coordinates relating to longitude and latitude, or in Universal Transverse Mercator (UTM) coordinates. In other scenarios, the native orientation of the satellite may be used to avoid costly preprocessing steps. However, transport lines, whether man-made such as roads or railways or canals, or natural, such as rivers, are generally not aligned with common geographic coordinate systems.

Moreover, a variety of methods for road surface classification have been proposed based on in-vehicles sensors to assess traction or optimize suspension. Such systems have been proposed to mitigate aquaplaning, determine a roadway state, classify winter road surface conditions, or classify road surface roughness using tire sensors.

If a larger geographical area covering a particular geographic line of interest is to be analyzed, e.g. if the geographic line has a substantial length or a significant portion of its surroundings needs to be analyzed, the amount of image data needed to cover that geographical area may easily become huge, in particular if the geographical area needs to be represented by an imagery stack containing many different images of that same area. If the amount of image data is large, processing such data for the purpose of conducting the desired analysis is also burdensome and may result in dissatisfying processing times or the need to employ very powerful computing systems.

It is an object of the present invention to provide an improved approach for encoding, in particular compressing, image data representing a geographical line and/or its surroundings.

Specifically, it is desirable to improve the efficiency, e.g. compression rate, of representing a geographical line or its surroundings by image data without unduly compromising the ca-pability of effectively and accurately monitoring one or more conditions of a geographical line or its surroundings based on that image data.

A solution to this problem is provided by the teaching of the independent claims. Various preferred embodiments of the present invention are provided by the teachings of the de-pendent claims.

A first aspect of the present invention is directed to a, particularly computer-implemented, method of encoding image data representing a geographical line, GL, or its surroundings. The method comprises applying a data compression process to reduce the spatial resolution of a given image represented by the image data. Specifically, the image may form an imagery layer of an imagery stack comprising various imagery layers, each imagery layer representing an individual image, e.g. of a same geographical region covering the GL. The data compression process comprises: generating two or more sublayers of the image by resampling at least one region of the image at a respective lower spatial resolution than its original spatial resolution, while maintaining or resampling the spatial resolution of at least one other region of the image such that, when the sublayers are overlapped to jointly define a combined multi-resolution representation of the image, the average resolution of the combined multi-resolution representation is lower than the original resolution of the image.

The term "geographical line", as used herein, refers particularly to a line, i.e. a longer straight or curved continuous, predominantly one-dimensional geometric structure, on the surface of the earth. A geographical line may be man-made (such as a road, a railway track, a power line, a dam, a bridge, a canal, a pipeline or a borderline) or natural, such as a river. Specifically, a geographical line may be a transport line, i.e. a line forming or being part of a transport infrastructure, e.g. for transporting goods, people or energy. A geographic line may correspond to a section of a more complex network comprising multiple geographic lines, such as for example a road network comprising multiple interconnected roads, a railway system comprising multiple interconnected railway tracks or a pipeline system comprising multiple interconnected pipeline branches.

The term "surroundings" of a geographical line, as used herein, refers particularly to the immediate neighborhood of the geographical line, typically in the range of less than a meter up to a few hundred meters measured in a direction perpendicular to the direction of the line at any given point thereon.

The terms "first", "second", "third" and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Where the term "comprising" or "including" is used in the present description and claims, it does not exclude other elements or steps. Where an indefinite or definite article is used when referring to a singular noun e.g. "a" or "an", "the", this includes a plural of that noun unless something else is specifically stated.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Thus, the method provides an efficient and effective approach for encoding image data representing a GL or its surroundings, thereby achieving a compression rate resulting in a reduced amount of image data being needed to represent the compressed image relative to the amount of data needed to represent the original image. The compression is generally not uniform across the whole image but instead defined in such a way that a subsequent further processing, esp. analyzing, of the GL and its surroundings is optimized to achieve a high accuracy for image features of high importance, e.g. features focusing on the GL itself and its immediate neighborhood, while allowing for a reduced accuracy and thus higher compression rate for image features located elsewhere in the image. Particularly, the method may also be used to increase the efficiency, e.g. in terms of speed and data processing and transmission and storage efficiency, of methods of further processing, in particular analyzing, the resulting compressed image data. The method of the second aspect, which will be described below, is a non-limiting example of such an image processing method.

Particularly, the method of the first aspect may be used to achieve very high compression rates such that storing originally large amounts of data becomes feasible on storage-constrained systems, transmission of such data is enabled over bandwidth-constrained channels like cellular networks, and memory footprints of machine learning-centric algorithms are reduced, enabling application on memory-constrained systems. Especially in geographical regions, e.g. rural regions, with a low density of GLs, such as transport line networks, this allows for very high compression rates such that storing such images on a device or transmitting them via cellular networks becomes possible without losing the essential information about the transport line network.

In the following, preferred embodiments of the method of the first aspect are described, which can be arbitrarily combined with each other or with other aspects of the present invention, unless such combination is explicitly excluded or technically impossible.

In some embodiments, the lower spatial resolution at which said at least one region of the image is being resampled is a function of the distance of the region from the GL. Particularly, the spatial resolution may be lower for larger distances and higher for smaller distances. In this way, the achievable accuracy for evaluations relating to the GL itself or its immediate neighborhood may be chosen to be higher than for more remote areas in the surroundings of the GL. For example, it might be important to detect any vegetation overgrowing the GL with a high accuracy while detecting particulars of a vegetation that is located more remotely from the GL might be less relevant such that the advantages of the compression may dom-inate over the need to have a high resolution in those remote locations.

In some embodiments, overlapping the sublayers comprises aggregating the values of spatially overlapping image points of different sublayers according to a predetermined aggregation method to obtain an image point value of an image point representing, in the resulting combined multi-resolution representation, a spatial region corresponding to the overlapping image points of the different sublayers. Specifically, one or more of the various aggregation methods mentioned above in connection with embodiments comprising aggregating sub-sets of image point values, may also be applied here.

In some embodiments, the image points of a first one of the sub-layers are locally aligned to the respective local orientation of the GL at or near the respective image point, while the image points of a second one of the sub-layers correspond to a regular orientation of image points in the given image before compression. This has the advantage that in spite of the loss of imagery information caused by the compression, the most relevant imagery information, e.g. imagery information relating to the GL or its immediate surroundings, remains available at sufficiently high resolution and in an optimized orientation corresponding to the route of the GL. The resulting processed image layer may either be used itself as the desired compressed version of the original image layer or may instead be used only as an intermediate image, which is then further processed, in particular rectified as discussed below, to yield a final compressed version of the original image layer.

In some embodiments, overlapping and aggregating the values of the spatially overlapping image points of different sublayers comprises generating the combined multi-resolution representation of the image such that the orientation of the resulting image points of that representation is the same among all of these image points (i.e. a rectified compressed multi-resolution image layer results from this operation).

A second aspect of the present invention is directed to a, particularly computer-implemented, method of determining one or more conditions, of a geographical line, GL, or its surroundings. The method comprises: (i) acquiring geo-referenced earth observation data representing one or more spatially overlapping imagery layers covering from an aerial or space perspective a specific region of interest, ROI, of the Earth's surface, the ROI comprising the GL; (ii) Encoding the respective image represented by at least one of the imagery layers according to the method of the first aspect; (iii) geometrically transforming the geo-referenced observation data, at least in parts and including the encoded respective image of the at least one of the imagery layers, into a local internal frame of reference of the GL within the ROI to obtain a mapping of the geo-referenced observation data to respective corresponding coordinates within the local internal frame of reference of the GL; and (iv) Evaluating the mapped earth observation data as represented in the local internal frame of reference of the GL according to a classification scheme to obtain therefrom evaluation data representing a classification of one or more properties of the GL or of its surroundings according to one or more conditions—such as physical, chemical or biological conditions—of the GL.

Accordingly, the method of the second aspect may be considered a sophisticated measurement method for measuring one or more, particularly physical (e.g. meteorological, geospa-tial, geomorphological, geological, electromagnetic), chemical or biological, conditions of the GL, wherein one or more measurement results being represented by the evaluation data are determined based on a set of measured geo-referenced earth observation data, e.g. data generated by one or more image sensors (e.g. satellite-based or aircraft-based), and optionally further sensor data. In addition to current measurement values for said conditions, also temporal developments thereof and related measures, e.g. yearly averages (e.g. for suitably modeling permafrost soil), may be determined. The efficiency of the method is high, in particular because of the incorporated image encoding step according to the method of the first aspect.

The term "condition of a geographical line" and similar expressions, as used herein, refer particularly to a detected or detectable state, particularly a current state of the geographical line at one or more locations on the line. Specifically, each state or condition may be a physical, chemical or biological condition of the geographical line or a combination of two or more of these, which condition or combination of conditions can be detected by means of image analysis or by one or more suitable sensors. Without limitation, the physical or chemical or biological properties of a road pavement, e.g. asphalt, the locations and dimensions of potholes in a road, geologic phenomena and overgrowing vegetation, the presence of landslides, avalanches, rockfalls, or flash floods, if and to the extent they affect a geographical line, are all examples of a condition or combination of conditions of a geographical line.

The term "acquiring" data, e.g. geo-referenced earth observation data, refers particularly to (i) generating that data by the "acquiring" entity itself, e.g. by means of one or more sensors or by deriving it from input data, or (ii) to receiving that data from an external data source.

The term "geo-referenced reference geometry", as used herein, refers to a geometry, e.g. as represented by respective data, that is defined or expressed in terms of a geographic coordinate system, such as longitude and latitude or UTM coordinates. In particular and without limitation, a geometry of a particular road as represented by an electronic map serving as a reference, such as an electronic map based on map data for car navigation systems or map or navigation applications on a computer or handheld device, e.g. smart phone or tablet computer, is a geo-referenced reference geometry. The same applies, of course, to respective reference geometries of other geographical lines, e.g. railways, border lines, rivers etc., which may particularly also be represented by respective map data or other geo-referenced geometry data.

The term "local internal frame of reference of the geo-graphic line (GL)", as used herein refers particularly to a frame of reference, such as a coordinate system, that is generally different from a geo-referenced frame of reference. The geographical line rests in the local internal frame of reference and is represented therein as a line of a predetermined selected geometry, which may particularly be a straight line. Specifically, in the case of the geographical line being a road, such frame of reference is often referred to as "road space". Accordingly, a GL which is a bound line in a geographic frame of reference (geographic coordinate system), using for example longitude and latitude as coordinates or UTM coordinates, may be represented as a straight line in its local internal frame of reference. For example, in the local internal frame of reference, the coordinates of a given location on the GL may comprise (i) a first coordinate representing a distance of this point from a predefined reference point on the line, the distance being measured along the path of the line (e.g. road kilome-ter), and (ii) a second coordinate expressing a distance of the given point from a (physical or virtual) center line of the GL measured along a straight line running through the given point in a direction being perpendicular to the GL.

The term "classification scheme", as used herein, refers particularly to a scheme for classifying one or more conditions of a geographical line according to a set of classes. By way of example and without limitation, such classes may relate to different physical conditions, e.g. presence or absence of pavement, potholes, ice or snow, rocks or other items of a road surface, to different degrees of overgrowing of vegetation over a given GL, to current wind or precipitation conditions etc.

Accordingly, the method of the second aspect comprises an effective, usually non-linear, geometric transformation of geo-referenced earth observation data from a world space, the observation data referring to a region of interest covering a GL of interest, into a local internal frame of reference of this GL to obtain a respective view (e.g. image or combined stack of different images) of the GL in that local frame of reference. Specifically, this local frame of reference and the way of representing the GL therein may form a very suitable and easy to use basis of a normalized representation (e.g. a normalized road space) of GLs, which may particularly be beneficial for subsequent classification steps or comparisons with other GL-related data, e.g. comparisons between the respective conditions of two or more different GLs or between respective conditions of a same GL, but at different points in time. Furthermore, because of the transformation, the method allows for using various different earth observation data (esp. image data) as an input, in particular independent of the respective orientation or resolution at which that data was captured. The resulting evaluation data resulting from the classification may be used in many different applications, as will be discussed in more detail below.

Specifically, the usage of earth observation data, such as satellite imagery, may compensate the lack of data on road surface quality in rural areas where no sufficient data from the ground is available. The method of the second aspect thus provides a canonical way of using satellite imagery and optionally also supplementary data to provide a normalized view on road segments and other geographic lines.

An additional benefit of the method can be achieved in that otherwise unconnected image regions may be transformed into contiguous regions based on the geometry of the transport line. This may reveal otherwise non-obvious spatial and temporal patterns. Furthermore, some methods such as machine learning require input data of a unified structure which also results from this method, where data with different dimensionality can be projected into the rectified road space.

In the following, preferred embodiments of the method of the second aspect are described, which can be arbitrarily combined with each other or with other aspects of the present invention, unless such combination is explicitly excluded or technically impossible.

In some embodiments, geometrically transforming the geo-referenced observation data, at least in parts, into the local internal frame of reference of the GL comprises: (i) defining a plurality of control points within the ROI at different positions along the GL; (ii) determining for each control point a respective local cell grid covering a limited local spatial neighborhood of that control point, the resulting set of local cell grids defining the local internal frame of reference of the GL; and (iii) geometrically transforming the observation data, at least in parts, into the local internal frame of reference of the GL to obtain a mapping of the observation data to the set of local cell grids of the control points. This approach is particularly flexible in that the local internal frame of reference is defined by a combination of the local cell grids, each of which may be independently optimized, particularly in terms of its orientation relative to its corresponding control point. Furthermore, the approach is also very efficient, because the set of local cell grids in total does not have to cover the whole GL, but may instead cover only a portion thereof, such as a set of selected segments of the GL within the ROI and their respective neighborhoods, so that the total data amount of the transformed observation data may be effectively limited and in particular may be less than that of the original geo-referenced observation data covering the ROI. While one or more of the local cell grids may have a rectangular pattern, other shapes are possible as well, e.g. hexagonal cells in a corresponding hexagonal grid. In fact, the term "local cell grids", as used herein, even comprises the possibility that a local cell grid comprises or consists of one or more cells that are separated from each other by intermediate spaces, e.g. several non-connected circular cells arranged in a determined pattern.

In some related embodiments, the method further comprises concatenating the individual cell grids of the control points to form a data representation of a rectified, particularly regular, overall cell grid defining the local internal frame of reference of the GL, in which the individual cell grids of the control points are arranged in an aligned rectified manner in a sequence corresponding to the sequence of the control points along the GL. This has the advantage of providing a particularly simple, compact and easy-to-handle frame of reference. Specifically, it allows for a particularly simple normalized representation of the transformed observation data or the resulting evaluation data, in particular for the above-mentioned purposes of comparing such data with other respectively represented data.

In some of these embodiments the evaluation of the respective earth observation data is performed based on the representation of the earth observation data as mapped to the rectified overall cell grid. This means that not only the end result is represented based on the rectified overall cell grid, but that also the actual preceding evaluation of the transformed observation data (and optionally additional sensor data) is already performed based on the rectified overall cell grid. This further improves the simplicity and efficiency of the evaluation process, because typically rectified frames of reference can be handled with less effort than most other kinds of frames of reference, e.g. bound ones. Specifically, rectified frames of reference may be very easily represented by simple and storage-efficient data structures, such as tables or matrices.

In some embodiments, at least one of the local cell grids is defined such that it has one or more of the following properties: (i) Anisotropic arrangement of at least a subset of the cells within the local cell grid; (ii) the widths or heights or distances of the cells vary among at least a subset of the cells within the local cell grid; (iii) an orientation of at least a subset of the cells within the local cell grid is aligned to the local orientation of the GL according to its geo-referenced reference geometry at the control point corresponding to the local cell grid. All of these specific variants (i) through (iii) have in common that they allow for an optimal adjustment of the related local one or more cell grids to the specific individual geometry of the GL and the desired kind of evaluation to be reflected in the evaluation data. If, for example, the GL is strongly curved in the vicinity of a particular first control point, the cell grid for that first control point might be defined to have a rather different orientation, variation of cell dimensions, and anisotropic arrangement of the cells within that local cell grid, than the cell grid for a second control point being located elsewhere on the GL, where the GL is rather straight.

In some embodiments, the geo-referenced earth observation data represents one or more image point values per image point of an original image point grid covering the at least one imagery layer. Moreover, geometrically transforming the geo-referenced observation data comprises determining at least one cell value for each cell of the local cell grid based on an aggregation of a subset of the image point values corresponding to an area of the ROI covered by the respective cell of the local cell grid. This is a particularly effective way of providing high flexibility and the possibility of optimally adjusting the transformation to the desired kind of evaluation. Furthermore, using a plurality of image point values per image point enables even more accurate or more complex evaluations, including evaluations relying on combining more than two image point values per image point to determine related evaluation data for that image point or a surrounding region around it.

Specifically, in some of these embodiments, aggregating said subset of the image point values comprises one or a combination of at least two of the following operations: (i) averaging the image point values of all image points being located fully within the corresponding cell of the local cell grid; (ii) averaging the image point values of all image points overlapping with the area of the ROI covered by the corresponding cell of the local cell grid, wherein each image point value is weighted according to the size of its overlap with that cell of the local cell grid; (iii) weighted averaging of the image point values, wherein image points located closer to the center of the cell of the local cell grid obtain higher weights than image points located more remotely from the center of the cell; (iv) determining the median, minimum and/or maximum image point values among the image point values covered by the corresponding cell of the local cell grid; (v) determining the image point values representing a specific percentile of the distribution of the image point values within the corresponding cell of the local cell grid; (vi) determining one or more of a range, a standard deviation, a variance or any other higher order function capturing characteristics of the distribution of image point values within the cell of the local cell grid; (vii) determining a histogram representing the distribution of image point values within the cell of the local cell grid. The result of the aggregation may be a single value or a data structure, depending on the kind of operation being applied. For example, the histogram according to variant (vii) will typically be represented by a data structure comprising multiple values, while an average of point values according to any one of variants (i) through (iii) will typically be represented by a single value.

In some embodiments, at least one of the local cell grids is defined by a set of grid parameters and the method further comprises determining at least one of said grid parameters based on a process involving machine-learning in connection with cross-validating intermediate results of the evaluation data obtained during the machine-learning process with reference parameter data representing known correct classifications of the related one or more properties of the GL or of its surroundings according to said one or more conditions. These embodiments enable, in particular, an automatic definition, even a dynamic adjustment or variation, of the local cell grids by means of the machine-learning based process. Hereby, the reference parameter data serves as training data, in the sense of supervised learning, for the machine-learning process.

In some embodiments, acquiring the geo-referenced earth observation data comprises one or more of the following: (i) acquiring geo-referenced earth observation data representing one or more of the imagery layers, each of these imagery layers representing imagery covering the ROI in a respective different spectral range of the electromagnetic spectrum; (ii) acquiring geo-referenced earth observation data representing one or more data layers as further imagery layers, each of these data layers representing respective sensory measurements or predictions, e.g. simulation results, of one or more local conditions of the GL or its surroundings within the ROI; (iii) acquiring geo-referenced earth observation data representing one or more preprocessed imagery layers resulting from a combination of two or more of said imagery layers of variant (i) or data layers of variant (ii). Both using two or more of the imagery layers per variant (i) or supplementing such image layer(s) with one or more of said data layers according to variants (ii) or (iii) allows particularly for extending the range of possible kinds of evaluations or their respective achievable quality and accuracy.

Specifically, in some of these embodiments, the data layers representing respective sensory measurements or predictions of one or more local conditions of the GL or its surroundings within the ROI represent one or more of the following: (a) precipitation, (b) intensity or wavelength of local radiation, (c) temperature, (d) air pressure, (e) wind force or direction, (f) if, at least in one section of the ROI, the GL is a water-based geographical line: speed and direction of water flow; (g) if, at least in one section of the ROI, the GL is a land-based geographical line that is accessible to a land-based vehicle: vibration, orientation, speed, acceleration or any other vehicle parameter measured by one or more vehicle-based sensors that may provide insight on particular conditions of the transport line; (h) if the GL is a transport line: a transport line usage frequency, a transport line maintenance status or a time since last maintenance interval, an age, or a constitution of the transport line surface; (i) climate zone, (j) climate profiles, (k) expected temperatures or precipitations, (l) susceptibility towards unexpected events such as accidents, natural disasters, floods, landslides, avalanches, storm damages, tornados, hurricanes, typhoons, (m) electromagnetic fields, e.g. signal strength of cellular networks covering the GL. This allows for a very large range of different evaluations, depending of the kinds of measurements or predictions selected from the above, and accordingly respective positive effects on the achievable quality and accuracy of the resulting evaluation data.

In some embodiments, the method comprises aligning the respective geometry of the GL in the one or more imagery layers as represented by the earth observation data with a geo-referenced reference geometry of the GL to form a combined imagery stack, wherein at least two of the imagery layers are incorporated in to the stack, each of these imagery layers representing a respective digital image in a given respective spatial resolution, wherein the spatial resolutions of at least two of these imagery layers differ from each other, at least in one overlapping region, thus yielding a combined multi-resolution imagery stack. Using such an alignment of the respective geometries of the GL enables a particularly simple, efficient and reliably way of performing the geometrical transformation, as the respective imagery data of the layers of the stack can directly be transformed by way of projection into the local internal frame of reference of the GL. Furthermore, the multiple different resolutions allow for a high efficiency of the method, in particular in terms of limiting the amount of data to be processed and thus enhancing the performance of the method, while at the same time maintaining the desired accuracy. This may particularly be achieved by selec-tively using either a higher one or a lower one of the available resolutions for different layers, in particular depending on the impact of a particular selection on the ability to achieve a respective necessary accuracy of a desired kind of evaluation.

In some embodiments, the method further comprises performing one or more of the following operations based on the evaluation data: (i) determining a navigation or information output of a vehicle navigation system; (ii) controlling a dynamic traffic sign; (iii) adjusting one or more configurable technical parameters of a vehicle or other transport system; (iv) triggering a maintenance process or an inspection process with respect to the GL; (v) forecasting a future condition of the geographical line or its surroundings.

Specifically, in the case of variant (i), the output of the vehicle navigation system may refer to a particular route being selected as a preferred route or as a selected route for navigation purposes among a plurality of possible routes leading to a specific destination. In the case of variant (ii) the dynamic traffic sign might specifically be a sign indicating whether or not a certain road segment may be entered or not or a warning sign capable of signaling two or more different warning levels or categories depending on its current configuration, which may be controlled, i.e. selected, based on the evaluation data. In the case of variant (iii), the one or more configurable technical parameters might specifically relate to a respective particular suspension set-up of the vehicle or transport system. In the case of variant (iv), the maintenance process or inspection process might specifically be triggered by causing a related signaling, e.g. to inform maintenance personnel accordingly, or these processes might even be fully or partly automated processes being triggered automatically by a respective trigger signal.

A third aspect of the present invention is directed to a data processing system being configured to perform the method of the first aspect or the second aspect. The data processing system might specifically be configured by means of one or more computer programs to perform the method of the first aspect or the second aspect. In addition, or alternatively, the configuration may be implemented, in whole or in parts by respective hardware.

A fourth aspect of the present invention is directed to a computer program or a computer program product, comprising instructions, which when executed on a data processing system according to the third aspect of the invention cause the system to perform the method according to the first aspect or the second aspect of the invention.

The computer program (product) may in particular be implemented in the form of a data carrier on which one or more programs for performing the method are stored. Preferably, this is a data carrier, such as a CD, a DVD or other optical medium, or a flash memory module. This may be advantageous, if the computer program product is meant to be traded as an individual product independent from the processor platform on which the one or more programs are to be executed. In another implementation, the computer program product is provided as a file on a data processing unit, in particular on a server, and can be down-loaded via a data connection, e.g. the Internet or a dedicated data connection, such as a proprietary or local area network.

The system of the third aspect may accordingly have a program memory in which the computer program is stored. Alternatively, the system may also be set up to access a computer program available externally, for example on one or more servers or other data processing units, via a communication link, in particular to exchange with it data used during the course of the execution of the computer program or representing outputs of the computer program.

The explanations, embodiments and advantages described above in connection with the method of the first aspect similarly apply to the other aspects of the invention.

BRIEF DESCRIPTION OF THE DRAWINGS

Further advantages, features and applications of the present invention are provided in the following detailed description and the appended figures, wherein:

Referring to FIG. 1 an exemplary embodiment 100 of a method of the second aspect of the present invention comprises a step S1 of acquiring geo-referenced earth observation data comprising aerial imagery data acquired from one or more drones 101, aircraft 102 or sat-ellites 103 or any other devices being capable of recording multi-spectral observation data of the earth 104, in particular of its surface.

Figure 1:
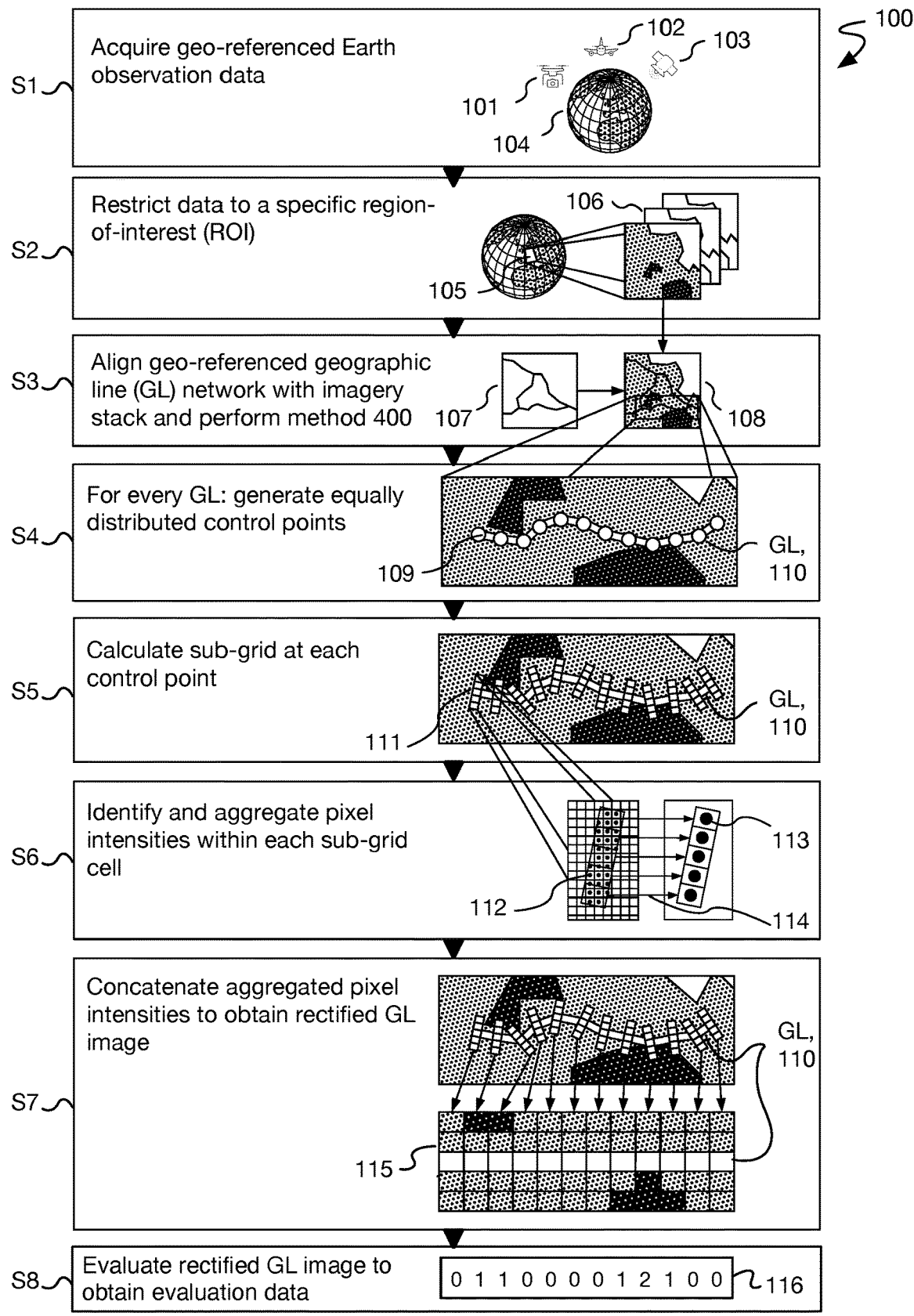
FIG. 1 schematically illustrates an exemplary embodiment of a method according to the second aspect of the present invention.

In a further step S2, a specific region-of-interest (ROI) 105 is selected, e.g. a particular location, a rectangular region, a specific country, state, city or any arbitrarily shaped region or any combination/union of such regions, which may even be non-contiguous. The further processing of the acquired observation data will focus on that ROI. Thus, a stack 106 of multiple imagery layers (each imagery layer forming one image) is obtained, wherein particularly each image layer may correspond to a respective associated spectral band, such that the stack comprises in total multiple spectral bands in different imagery layers. For example, a typical RGB image layer would contain three channels. Satellite imagery may contain additional infrared bands, e.g. the Sentinel-2 satellite images provide 12 bands. Active sensors—radar or lidar—with an active signal emission component may provide one or more additional imagery layers independent of the natural light sources. Additionally, these image layers may contain preprocessed imagery that was generated by combining image data from different channels or via preprocessing methods to obtain digital elevation models. The image stack may contain images from the same source, e.g. a specific satellite system, but recorded at different dates (time-series), or even from different source systems, e.g. different satellite systems or aircraft-based or drone-based earth surveillance systems. Further imagery layers of stack 106 may be data layers representing sensor data acquired from other sensors than image sensors, e.g. land-based sensors or even vehicle-based sensors, such as vibration sensors.

In a further step S3, one or more geo-referenced geographic lines GL or networks 107 of GLs, such as road networks (or any other transport line networks or geographic bounda-ries), are aligned with the geo-referenced imagery stack 106 to obtain a combined imagery stack 108. The transport line network may be obtained (a) manually, e.g. by an operator defining geo-coordinates of the to be assessed transport line, (b) from existing databases such as "Open-StreetMaps", (c) via any image processing method that derives vector data from imagery, or (d) via automatically recorded vehicle GPS (or Galileo or Glonass etc.) tracks. The transport line network may be defined by a graph consisting a series of nodes (defined by their latitude and longitude coordinates on the globe) and their connections. Although this is the most common case, this does not exclude other ways of defining lines such as Bezier curves, splines, or any other parametric curves.

Step S3 further comprises applying the compression method 400 of FIG. 4 (which is an exemplary embodiment of the method of the first aspect of the present invention and will be described in detail below) to compress at least one of the imagery layers of combined imagery stack 108 such that after the compression, imagery stack 108 comprises at least one imagery layer being compressed according to method 400. Of course, these two sub-steps (alignment and compression) of step S3 may also be treated or implemented as separate steps of method 100.

Figure 2:
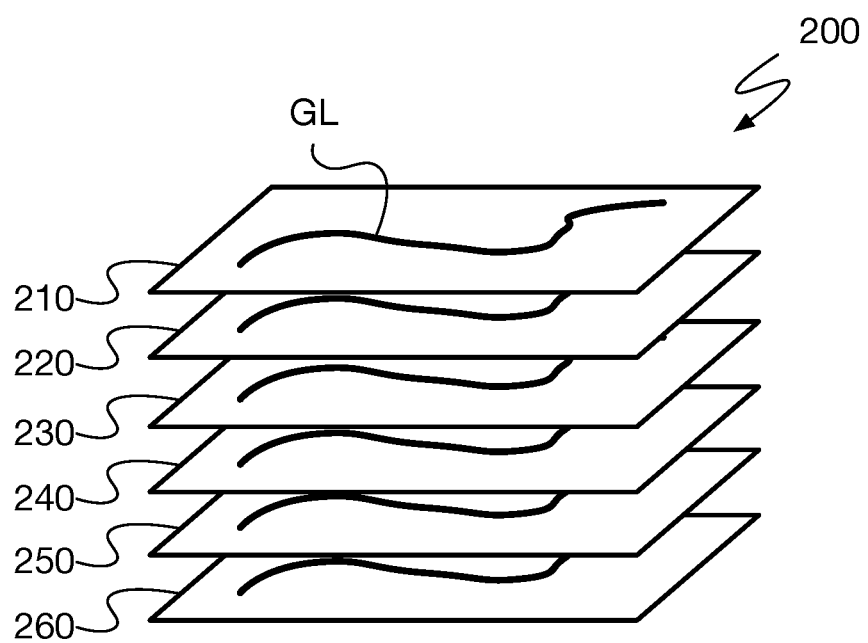
FIG. 2 schematically illustrates an exemplary combined imagery stack with aligned layers.

FIG. 2 illustrates an exemplary combined imagery stack 200 (i.e. an exemplary instantiation of the combined imagery stack 108 discussed above) comprising six different imagery layers 210 through 260. The combined imagery stack 200 has already been aligned per step S3 with respect to a GL for which an evaluation is to be performed using method 100. By way of example, layer 210 may represent an image in the visual part of the electromagnetic spectrum, e.g. expressed in the RGB color space or any other suitable color space for this spectral range. The image data of layer 210 may have been provided by a satellite system, e.g. Landsat or Sentinel. Layer 220 may represent an elevation/topology image provided by a digital elevation model and may have been generated by combining image data from different channels, e.g. also from a radar channel. Further layer 230 may represent an image showing a spatial distribution of vegetation and optionally the kind of vegetation, for the covered region (ROI). Yet further layer 240 may represent an image indicating the kind of surface present in the ROI at the various locations therein. This layer may particularly be derived from image analysis of layer 210 or by combining data from several imagery layers and/or other data sources, like on-the-ground sensors, e.g. for the determining the kind of surface of the GL itself, particularly if the GL is a road. Layer 250 may represent evaporation data across the ROI, which may particularly be relevant for detecting properties of the surroundings of a GL, e.g. for areas covered with forest, meadows, rivers, lakes, snow etc. Layer 260 may represent weather data for the ROI, such as precipitation prediction data. Further layers may for example represent historical weather data for the ROI. Accordingly, it is noted that an imagery layer (in brief "layer") is not restricted to representing an optical image but may also represent other data that can be used to characterize a condition of the ROI. This data may be data that is provided directly by one or more image sensors or other sensors or it may only be derived from such sensor data, e.g. by way of computation and/or by way of combining two or more different kinds of input data, e.g. two or more other imagery layers, to derive the data for the imagery layer in question. As discussed above, after step S3, at least one of the imagery layers of combined imagery stack 108 is compressed according to method 400 of FIG. 4.

Referring again to FIG. 1, method 100 further comprises a step S4, wherein for every contiguous line segment 110 of the network 107, i.e. for at least one GL in the network 107, a sample of control points 109 is defined, e.g. by selecting equally distributed points on the line segment 110. Other sampling schemes may be favorable depending on the use case. If, for example, the to-be-monitored GL contains intrinsic control points, one might use these existing control points instead of a mathematical sampling scheme. A typical scenario would be monitoring of overhead power lines, where control points 109 could be sampled at the locations of the transmission towers/electricity pylons.

In a step S5, a respective sub-grid 111 is placed at each control point 109, where each respective sub-grid's orientation is determined from the local orientation of the GL at that control point 109. Specifically, the sub-grids 111 may be defined as regular linear grids being arranged in a direction perpendicular to the path of the GL according to the geo-referenced frame of reference of the imagery data. The captured spectral variability and visual complexity of the surroundings of the to-be-monitored GL is controlled by the grid parameters (number of cells, width and height of each cell) of the sub-grids 111 and the number of control points 109.

In one exemplary implementation, these parameters are received via a user interface. Thus, they may be manually chosen due to expert knowledge in a specific domain. In another exemplary implementation, these parameters may be optimized by machine learning and cross-validation methods, i.e. a method is trained with various parameter sets and the results compared to known reference data (supervised learning). The parameter set that achieves the best accuracy may then be chosen as the final model. In yet another exem-platy implementation, multiple parameter sets are combined and used at the same time for a specific prediction method. Thus, a multi-resolution image stack is obtained at each control point 109. A typical example could be the monitoring of roads, where a high-resolution grid is able to detect certain road marking patterns while lower resolution grids capture vegetation characteristics besides the road.

Now, in a process comprising further steps S6 and S7, the imagery stack is geometrically transformed to a local internal frame of reference of the GL. To that purpose, in step S6, in each sub-grid 111, image features from the source images 112 are aggregated by means of a suitable aggregation function 114 across the image region where the source images 112 overlap with the respective sub-grid 111, to obtain either a single value or a data structure for each grid cell 113 of the respective sub-grid 111.

Typical suitable aggregation functions 114 are (a) averaging the pixel intensities of all pixels of the respective source image 112 located fully within a cell 113 of the sub-grid 111, (b) averaging the pixel intensities of all pixels of the respective source image 112 that overlap with the cell 113, modified by the percentage of how much space they contribute to the cell (c) weighted averaging of pixel intensities where pixels in the center of the cell 113 obtain higher weights than pixels located at the border (d) median, minimum and maximum intensities, (e) intensities representing a specific percentile of the intensity distribution within the cell 113, e.g. to account for outliers, (f) range, standard deviation, variance or any other higher order function capturing characteristics of the intensity distribution within the cell 113, (g) histograms of intensities, (h) histograms of orientations or other image features. The latter two are special cases as they increase the dimensionality of the output space (e.g. road space) but give a more detailed characterization. While this is a non-exhaustive list of potential feature extraction methods, others might be favorable for specific use cases.

The sub-grids 111 may be anisotropic, i.e. width and height of grid cells may not be equal in order to model that certain characteristics of transport lines vary greatly with lateral distance from the center of the transport line but remain mostly the same along the transport line. Furthermore, the sub-grids 111 may be non-equidistant, i.e. width and height of grid cells may vary, e.g. to model stronger smoothing when further away from a transport line. Other variations among the cells are possible too.

Figure 6:
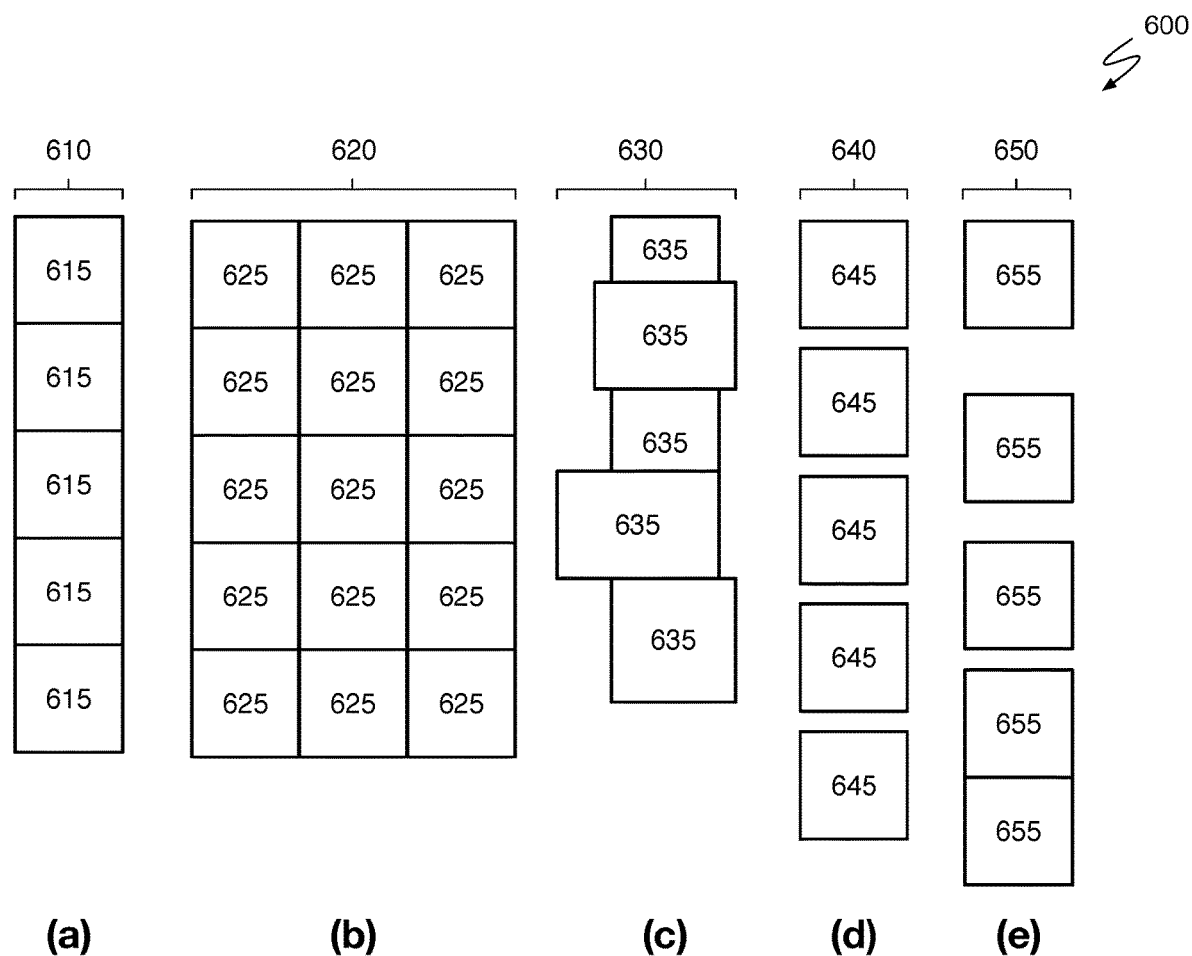
FIG. 6 illustrates various different exemplary embodiments of sub-grids 111.

FIG. 6 specifically illustrates a set 600 of various different exemplary embodiments of sub-grids 111. Specifically, FIGS. 6(a) and (b) illustrate examples of elements of a first category ("regular") of sub-grids 610 and 620, respectively, wherein the individual cells 615, 625 are arranged in a regular order, such as a one-dimensional matrix arrangement 610 or a two-dimensional matrix arrangement 620, wherein in each case all cells 615, 625 have a same shape, size and orientation and distance (center-center) from their respective neighbor cells. FIG. 6c illustrates an exemplary sub-grid 630 of a second category ("anisotropic"), which is characterized in that the shape and size of the various cells 635 may vary. Particularly, in the case of rectangular cells 635, their width and height may vary across the set of cells in the sub-grid. FIGS. 6d and 6e illustrate exemplary sub-grids 640 and 650, respectively, of a third category ("Non-gapless"), which is characterized in that at least some the cells of the sub-grid are arranged in a spaced-apart manner. In FIG. 6d, the cells are equidistantly spaced arrangement, while in FIG. 6e the distances between neighboring cells may vary ("non-equidistant"). Further embodiments of sub-grids 111 may be obtained by implementing two or more of the above examples simultaneously, (unless contradictory). For example, the two-dimensional aspect of arrangement 620 may be mixed with any one of embodiments 630, 640 and 650 to define respective two-dimensional versions of the cell arrangements according to embodiments 630, 640 or 650, respectively. Referring again to FIG. 1, in subsequent step S7, the obtained values for each cell 113 in each sub-grid 111 are placed in a regular grid 115 (e.g. a rectified road space, if the GL corresponds to a road), thus yielding for each layer a geometrically transformed rectified image of the GL and its surroundings, which may be used for further processing and for visualization purposes. Specifically, the regular grid 115 defines the local internal frame of reference of the GL and the positions of the individual cells of the grid 115 may be considered coordinates of this local internal frame of reference.

Method 100 further comprises an evaluation step S8, in which the stack of transformed rectified images of the GL and its surroundings is evaluated by means of applying a classification scheme to obtain evaluation data representing a classification of one or more properties of the GL or of its surroundings according to one or more conditions—e.g. physical, chemical or biological conditions—of the GL.

Figure 3:
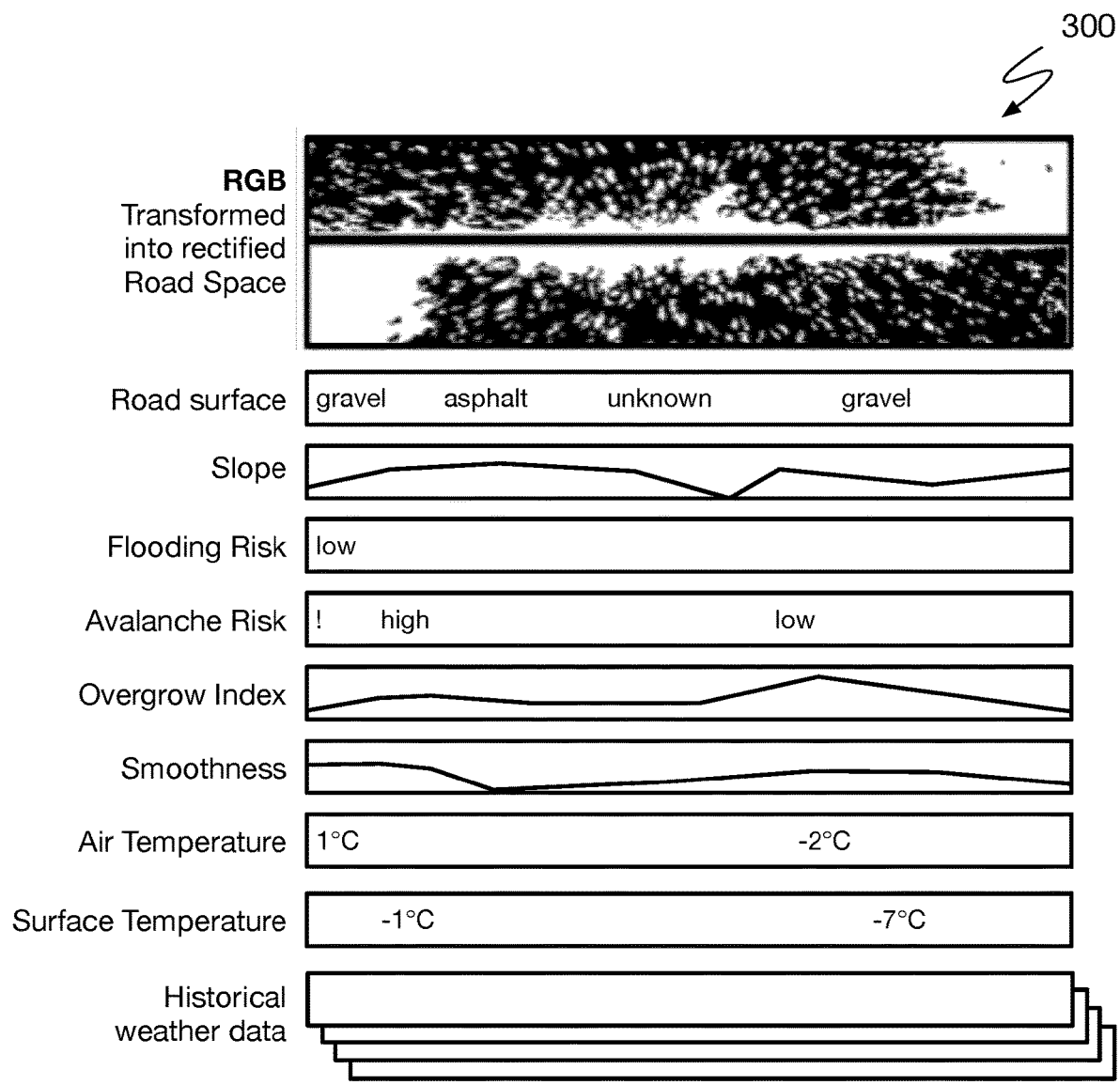
FIG. 3 shows an illustration of a set of exemplary output of possible evaluation results of the method of FIG. 1 or FIG. 5.
Figure 5:
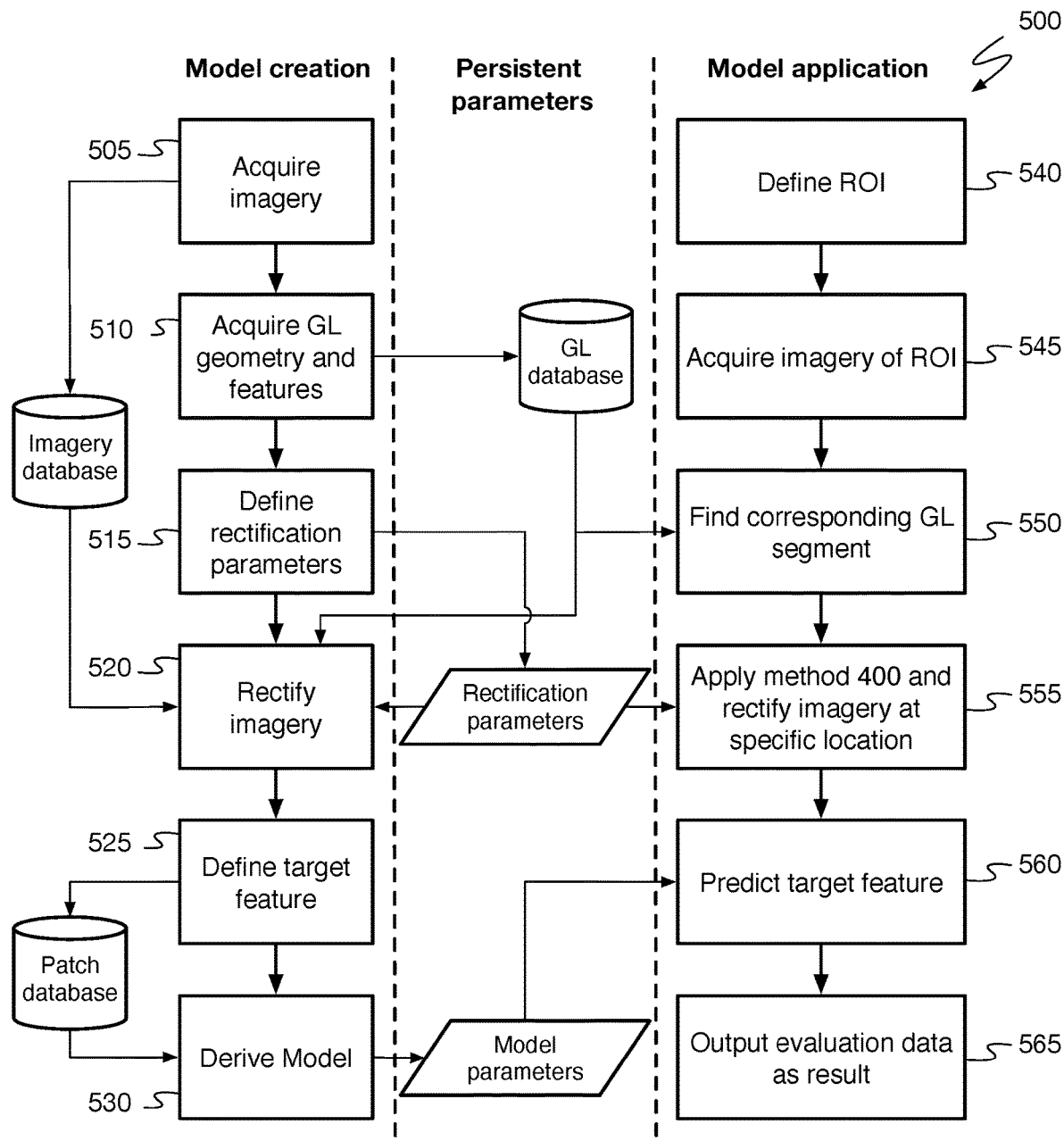
FIG. 5 shows a detailed flow chart illustrating an embodiment of a method according to the second aspect of the present invention, the method comprising specifically (i) a model creation phase for optimizing a parametrized model of the method, and (ii) a model application phase for applying the optimized model as an instantiation of the method to actually perform a determination of evaluation data representing a classification of one or more properties of the GL or of its surroundings according to one or more conditions of the GL.

FIG. 3 illustrates exemplary evaluation data that may result from performing the method of the present invention, e.g. the method of FIG. 1 or FIG. 5, and relating to multiple different classifications with respect to a GL in the form of a road. In the example, the classification relates to, amongst others, a kind of road surface, a slope of the road, a flooding risk, an avalanche risk, an overgrow index (indicating a level of vegetation overgrowing the road, cf. exemplary evaluation data 116 in FIG. 1), a smoothness of the road surface, an air temperature and road surface temperature along the road. In FIG. 3 the spatial extension of the GL, i.e. of the contiguous road segment of interest, extends from left to right in the RGB image on top of FIG. 3 and the various lines of data items shown below are arranged accordingly.

Thus, the method of FIG. 1 (the same applies to the method of FIG. 5 discussed below) is configured to provide normalized imagery stack comprising one or more imagery layers, with respect to geographic lines (GL) of interest such that these GLs appear always straight and go from left to right along the horizontal center line of the normalized image. Other arrangements of the sub-grids are likewise covered, e.g. arranging them row by row such that the road becomes a column in the image. The skilled person will take into account state-of-the-art considerations to select an appropriate memory layout, CPU architecture, and file system, e.g. storing each image layer in a single file may cause considerable overhead in certain file systems. The aforementioned method may be implemented in software or with dedicated hardware, e.g. semiconductor chips.

Figure 4:
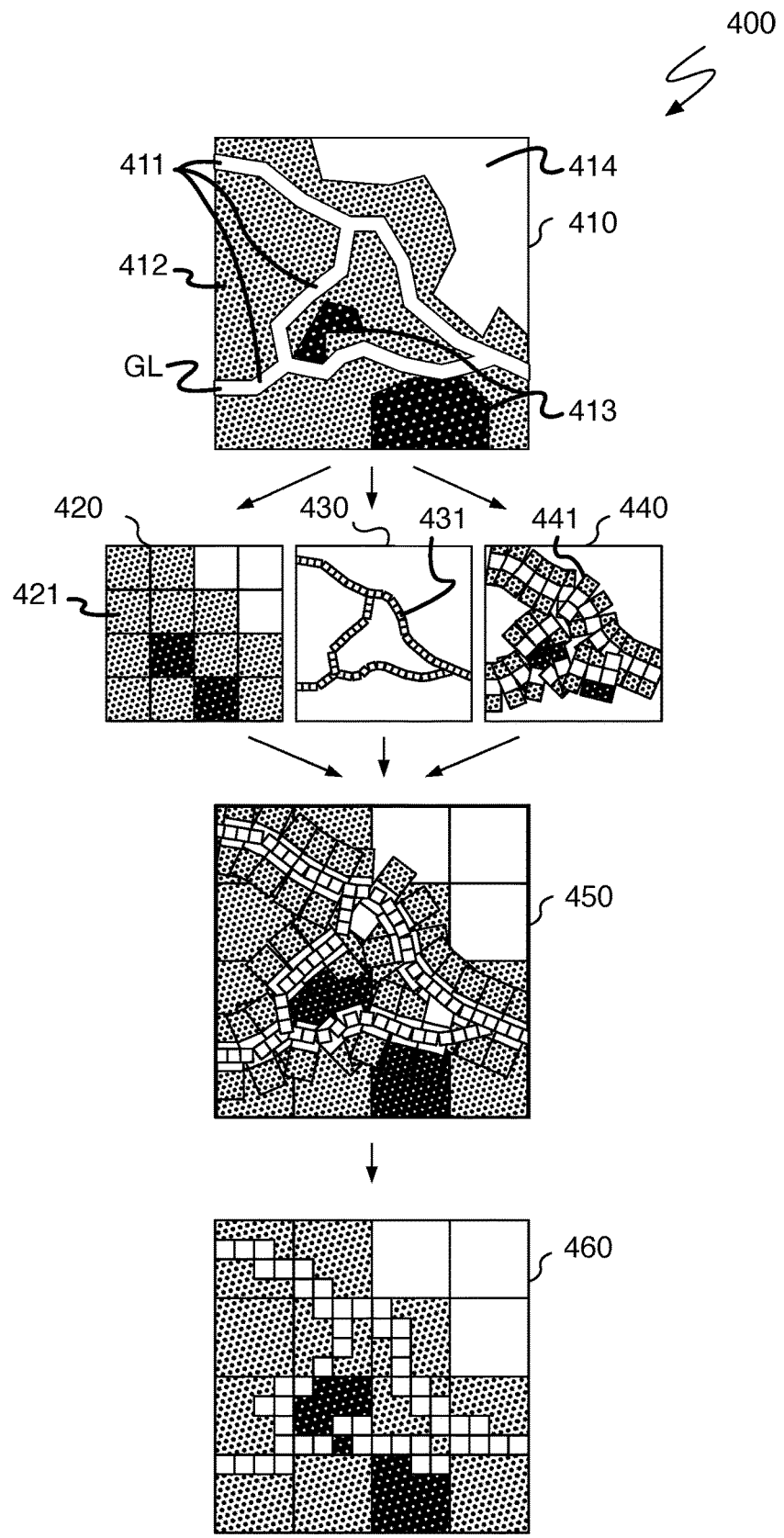
FIG. 4 schematically illustrating a data compression process for an imagery layer, according to certain embodiments of the method of the first aspect of the present invention.

FIG. 4 illustrates an exemplary embodiment of an image compression process 400 according to the first aspect of the present invention, which may be used, in particular in connection with any one of the methods 100 of FIG. 1 (cf. step S3) or 500 of FIG. 5 (cf. step 555), to compress image data representing an original imagery layer 410. Specifically, process 400 may be used to provide GL-focused compression of satellite imagery.

According to method 400, aerial or satellite imagery covering an ROI is processed in an irrelevance reduction-based approach where the focus is on those image points (pixels) of the original imagery layer 410 representing the ROI that belongs to a GL of interest. In the present example, the GL of interest has been selected to be a specific transport line within a transport line network 411, e.g. road network, represented in image 410. However, the compression process of FIG. 4 does not depend on the selection of a specific GL with the transport line network 411 but is rather related to the whole ROI and thus the whole transport line network 411 and its surroundings.

In the present example, every GL (transport line) from the original image 410 is sampled densely with the aforementioned method for transport line rectification at multiple resolution levels, e.g. the GL itself may be stored at the native resolution 430, the immediate surroundings may be stored at half the native resolution 440, and so on. Thus, every satellite image is represented by a low-resolution base image and a series of higher resolution GL-related images. Specifically, in this example, the pixels representing the transport line network 411 itself are sampled densely with the aforementioned technique (cf. FIG. 1) involving sub-grids and additionally, the spatial resolution of surrounding pixels is varied depending on the lateral and longitudinal distances of those surrounding pixels with respect to a reference pixel, e.g. a pixel 431 that is part of a transport line network. For example, transport line pixels 431 may be stored at the native resolution of the original image 410, the pixels 441 representing the immediate surroundings of the transport line network 411 may be subsampled at a reduced sampling rate, e.g. at half the native resolution, and even more remote pixels 421 may be sampled at a yet lower resolution, and so on. Herein, each of the different resolutions may correspond to a related subsampling layer being sampled from the original image 410 at the respective resolution. Finally, a very low-resolution base image 420 is added to the stack of subsampling layers.

In this way, multiple different solutions may be used to collectively represent a resampled version of original image 410. The orientation of the pixel grid of base image 420 may particularly correspond to that of original image 410 (rather than being aligned to the path of the GL). The native resolution and subsampling windows of each subsampling layer 420, 430, 440 and the total number of subsampling layers 420, 430, 440 comprise the parameters that control the amount of irrelevance reduction performed by this compression process 400.

The emerging data structure effectively compresses the original data 410 which would typically contain vast amounts of irrelevant information with respect to the application focus that is only on those areas of the original data 410 that contain GLs by successively reducing the information density the further away data points are from these GL-centered areas of interest.

In order to reconstruct a single, compressed rectified multi-resolution image 460 from the various individual layers 420, 430 and 440, the low-resolution base image 420 is overlaid with all the GL-focused subsampling layers 430 and 440 of increasing native resolutions to reconstruct an intermediate image 450 that yields a high level of detail only in those areas of the GLs and their immediate surrounding, while only crude level of detail is preserved in those regions that have a low density of GLs.

Then, the desired compressed rectified multi-resolution image 460 is restored by combining the respective overlaid pixel values from each of the superposed 420, 430, 440 layers of the intermediate image 450 and mapping them to the pixel grid of image 460, thus achieving also a rectification. Specifically, the orientation of the pixel grid of image 460 may be same as that of the base image 420. Some areas of intermediate image 450 may be covered by pixels from different layers 420, 430 or 440. In this case, an application-specific combination function is to be applied, e.g. the median, mean or weighted mean of the contributing pixels of subsampling layers 420, 430 and 440, to determine a single pixel value for each pixel of image 460.

This scenario allows for very high compression rates such that storing originally large amounts of data becomes feasible on storage-constrained systems, transmission of such data is enabled over bandwidth-constrained channels like cellular networks and memory footprints of machine learning-centric algorithms are reduced, enabling application on memory-constrained systems. Especially in geographical regions, e.g. rural regions, with a low density of GLs, e.g. of transport line networks, this would allow for very high compression rates such that storing such images on a device or transmitting them via cellular networks becomes possible without losing the essential information about the transport line network.

The methods and processes described above may particularly be used in connection with machine learning or pattern recognition frameworks. An example thereof is depicted in FIG. 5, which illustrates an embodiment of a model-based method 500 according to the present invention, the method comprising specifically (i) a model creation phase for optimizing a parametrized model of method 100 of FIG. 1 and (ii) a model application phase for applying the model as an instantiation of the method 100 to actually perform a determination of evaluation data representing a classification of one or more properties of the GL or of its surroundings according to one or more conditions of a GL.

Referring to the model creation phase of method 500, in a first step 505, imagery is acquired and stored in a database or file system ("imagery data base"). For example, the imagery may be similar to that of imagery stack 200 of FIG. 2, as discussed above.

In a further step 510, GL geometries are obtained from open or proprietary data sources, e.g. electronic map data of a ROI of interest, in which the GL is located, and stored in a database or comparable system ("GL data base"). This step 510 may optionally involve augmentation of the acquired GL features by other sensory input or predictions, e.g. simulation results, related to particular GL segments. For example, if the GL is a road, such other sensory input or predictions may relate, without limitation, to sensor data representing (a) vibration, orientation, speed, acceleration or any other vehicle parameter measured by one or more vehicle-based sensors that may provide insight on particular transport line conditions (b) measurements from road weather sensors to measure temperature, precipitation and air pressure (c) transport line usage frequency (d) transport line maintenance status or time since last maintenance interval (e) age and constitution of surface (f) climate zone, climate profiles, expected temperatures and precipitations (g) susceptibility towards unexpected events such as accidents, natural disasters, floods, landslides, avalanches, storm damages, tornados, hurricanes, typhoons; (h) electromagnetic fields, e.g. cellular network coverage (such data may for example be generated by sensory assessment of the network coverage, e.g. using test devices in the field, or by means of simulation).

The term "feature", as used herein, refers to a specific measurable condition of a GL or GL segment. A non-limiting set of examples of different features, such as kind of road surface, a slope of the GL (e.g. road or railway track), etc. are shown in FIG. 3, as discussed above.

In a further step 515, rectification parameters for a subsequent image rectification/normali-zation step 520 are defined either (i) by receiving respective parameter data over an interface, e.g. user interface, or (ii) by systematic evaluation. In the latter case (ii), a number of parameter sets is used to predict a certain target feature (i.e. a particular kind of condition of the GL) and based on a comparison with known reference image data describing an independently gathered and/or verified correct information for that feature, the best performing parameter set is finally chosen. Such a parameter set may particularly comprise parameters relating to the number of pixels, their size, arrangement, and orientation. The rectification step 520 produces a set of image patches stored in a file system or database ("Patch database") and may particularly comprise applying the compression method 400 of FIG. 400 to at least one of the imagery layers of the imagery acquired in step 505.

The term "image patch" or in brief "patch", as used herein, refers particularly to a rectified image of a contiguous section of a related GL. Specifically, the result 115 of step S7 of FIG. 1 is an image patch or may also be a set of two or more separate image patches, each image page relating to a particular contiguous section of a considered GL. If in addition to image data also sensor data is used to predict the target feature, the concept of an "image patch" may be extended to become a "rectified GL datagram" which contains in addition to the one or more image patches also one or more layers of sensor data covering the same GL or GL segment. For the sake of simplicity, the following steps are described with reference to image patches only, while the same concepts may be applied to rectified GL data-grams.

Depending on the desired use case, a to-be-modeled or to-be-predicted target feature is selected in a step 525. A pattern recognition method is then used in a further step 530 to derive a model. It selects a subset of the patches previously stored in the patch database for training and validates the results on a held-out subset. The model parameters describe a function that maps an arbitrary image patch to the target feature. For example, the model parameters may form parameters, e.g. weights, of an artificial neural network or regression values in a regression analysis process serving as a mathematical framework or basis of the model. Once the model parameters have been determined in step 530, the established model being represented thereby is ready for application.

Referring now to the model application phase of the method 500, this phase may start by first defining in a step 540 a geographic region of interest (ROI), acquiring the corresponding imagery in a further step 545 and finding in the GL database the data relating to a specific desired GL or GL segment located within the ROI, e.g. a specific transport line segment. Thus, all information is available in order to apply in a further step 555 both (i) the compression method 400 of FIG. 400 to at least one of the imagery layers of the imagery acquired in step 545 and subsequently (ii) image rectification with the same parameter set ("rectification parameters") as in step 520 of the model creation phase. Of course, these two sub-steps of step 555 may also be treated or implemented as separate steps of method 500. The target feature is then predicted in a further step 560 using the relevant obtained one or more image patches and the stored model parameters. The result in the form of respective evaluation data may then be output in a step 565, e.g. for visualizing or as input to optional further processing steps, e.g. for deriving control signals for controlling an apparatus, such as a dynamic traffic sign or barrier, based thereon.

The invention may be used for a variety of different applications. By way of example and without limitation, it may be used in connection with the following applications and related implementations of the invention (cf. FIG. 3):

In one implementation, a weather profile is determined for each GL or GL segment over a specific timeframe. It could (a) use an imagery layer of live weather forecast to model how much rain, snow or wind is expected within the next minutes, hours or days, (b) give an estimate based on historic data, how the weather will be in a certain time of the year, i.e. it could model seasonal weather phenomena along a GL, e.g. a road. Thus, route planning and navigation would obtain road segment specific weather risk information in order to avoid hazardous situations.

Another implementation would allow to assess maintenance requirements for specific transport line segments. The spectral information of road surfaces such as asphalt or con-crete have been shown to vary significantly with age and degradation state, i.e. maintenance actions could be triggered when a specific threshold is exceeded.

Yet another implementation would take into account the location and severeness of disasters. In some countries, very detailed information on locations of vehicle accidents is available. This allows to assign an accident risk level to each road segment or image patch and would allow to predict if other regions are prone to the same risks, e.g. an alley with trees close to the road may have a higher risk of fatal accidents than roads without trees along the road. The same method is applicable to cases of natural disasters. Almost every disaster causing human casualties is captured by the local authorities. Utilizing weather information, elevation data and disaster location in the image stack would allow to predict other transport lines that might be prone to the same disaster type. Thus, the present method could even support planning of new transport lines by assessing the risk of disasters along the intended route.

In yet another implementation, the method could be used to assess the expected amount of motion along or across a transport line. Motion would be defined as one or more vectors for each patch and could describe motion information such as wind, traffic or water flow.

While above at least one exemplary embodiment of the present invention has been described, it has to be noted that a great number of variations thereto exists. Furthermore, it is appreciated that the described exemplary embodiments only illustrate non-limiting examples of how the present invention can be implemented and that it is not intended to limit the scope, the application or the configuration of the herein-described apparatus' and methods. Rather, the preceding description will provide the person skilled in the art with constructions for implementing at least one exemplary embodiment of the invention, wherein it has to be understood that various changes of functionality and the arrangement of the elements of the exemplary embodiment can be made, without deviating from the subject-matter defined by the appended claims and their legal equivalents.

LIST OF REFERENCE SIGNS

GL geographic line, e.g. transport line, such as a road
100 exemplary embodiment of a method of determining one or more conditions of a geographical line, GL, or its surroundings
101 drone
102 aircraft
103 satellite
104 earth, in particular surface of the earth
105 region of interest, ROI
106 imagery stack
107 geo-referenced reference geometry of GL, e.g. road network from electronic map 108 combined imagery stack aligned to reference geometry of GL
109 control point
110 continuous GL segment, identical with GL in the present example
111 sub-grid
112 image features (e.g. pixel values) of geo-referenced source images from imagery stack
113 grid cell
114 aggregation function
115 rectified image with regular grid
116 evaluation data
200 combined imagery stack aligned to reference geometry of GL
210 RGB imagery layer
220 elevation/topology imagery layer
230 vegetation imagery layer
240 Surface type imaginary layer
250 evaporation imagery layer
260 precipitation prediction imagery layer
300 exemplary output of possible evaluation results of the method of FIG. 1 or FIG. 5
400 exemplary embodiment of a compression method
410 original image, i.e. original imagery layer
411 GL network, e.g. transport line network
412 snow-free ground
413 forest
414 snow-covered ground
420 low-resolution base image
421 image point (pixel) of low-resolution base image
430 native, high-resolution image of GL
421 image point (pixel) of high-resolution base image
440 reduced resolution, e.g. half resolution, image of immediate GL surroundings
441 image point (pixel) of reduced-resolution image
450 intermediate multi-resolution image resulting from superposition of images 420, 430 and 440
460 compressed rectified multi-resolution image
500 method of creating and applying a parametrized model of a method of determining one or more conditions of a geographical line, GL, or its surroundings
505-565 method steps of method 500
600 different exemplary embodiments of sub-grids
610 regular, one-dimensional sub-grid
615 cells of sub-grid 610
620 regular, two-dimensional sub-grid
625 cells of sub-grid 620
630 anisotropic one-dimensional sub-grid
635 cells of sub-grid 610
640 non-gapless, equidistantly spaced one-dimensional sub-grid
645 cells of sub-grid 640
650 non-gapless, non-equidistantly spaced one-dimensional sub-grid
655 cells of sub-grid 650

What is claimed is:

1. A method of compressing image data representing a geographical line, GL, or its surroundings, the GL being a man-made or natural continuous, predominantly one-dimensional geometric structure on the surface of the earth, the method comprising:
applying a data compression process to reduce a spatial resolution of an image represented by the image data, the data compression process comprising:
generating two or more sublayers of the image by resampling at least one region of the image at a respective lower spatial resolution than its original spatial resolution, while maintaining or resampling the spatial resolution of at least one other region of the image, such that, when the sublayers are overlapped to jointly define a combined multi-resolution representation of the image, an average resolution of the combined multi-resolution representation is lower than the original spatial resolution of the image.

2. The method of claim 1, wherein overlapping the sublayers comprises aggregating values of spatially overlapping image points of different sublayers, the image points being pixels, according to a predetermined aggregation method to obtain an image point value of an image point representing, in the combined multi-resolution representation, a spatial region corresponding to the overlapping image points of the different sublayers.

3. The method of claim 2, wherein overlapping and aggregating the values of the spatially overlapping image points of different sublayers comprises generating the combined multi-resolution representation of an imagery layer such that an orientation of the image points of the combined multi-resolution representation is the same among all of the spatially overlapping image points of different sublayers.

4. The method of claim 2, wherein a respective orientation of image points of a first one of the sub-layers are locally aligned to a respective local orientation of the GL at or near a respective image point, while image points of a second one of the sub-layers correspond to a regular orientation of image points in the image before compression, wherein the image points are pixels.

5. The method of claim 4, wherein overlapping and aggregating the values of the spatially overlapping image points of different sublayers comprises generating the combined multi-resolution representation of an imagery layer such that an orientation of the image points of the combined multi-resolution representation is the same among all of the spatially overlapping image points of different sublayers.

6. The method of claim 1, wherein a respective orientation of image points of a first one of the sub-layers are locally aligned to a respective local orientation of the GL at or near a respective image point, while image points of a second one of the sub-layers correspond to a regular orientation of image points in the image before compression, wherein the image points are pixels.

7. A method of determining one or more conditions of a geographical line, GL, or its surroundings, the GL being a man-made or natural continuous, predominantly one-dimensional geometric structure on the surface of the earth, the method comprising:
acquiring geo-referenced earth observation data representing one or more spatially overlapping imagery layers covering from an aerial or space perspective a specific region of interest, ROI, of the earth's surface, the ROI comprising the GL;
encoding a respective image represented by at least one of the imagery layers according to claim 1;
geometrically transforming the geo-referenced earth observation data, at least in parts and including the encoded respective image of the at least one of the imagery layers, into a local internal frame of reference of the GL within the ROI to obtain a mapping of the geo-referenced earth observation data to respective corresponding coordinates within the local internal frame of reference of the GL, in which the GL rests and is represented therein as a line of a predetermined selected geometry; and evaluating the mapped earth observation data as represented in the local internal frame of reference of the GL according to a classification scheme being a scheme for classifying one or more conditions of the GL according to a set of classes to obtain evaluation data representing a classification of one or more properties of the GL or of its surroundings according to one or more conditions of the GL, each such condition being a detected or detectable state of the GL at one or more locations on the GL.

8. The method of claim 7, wherein geometrically transforming the geo-referenced earth observation data, at least in parts, into the local internal frame of reference of the GL comprises:

defining a plurality of control points within the ROI at different positions along the GL;

determining for each control point a local cell grid covering a limited local spatial neighborhood of that control point, a set of local cell grids defining the local internal frame of reference of the GL; and geometrically transforming the observation data, at least in parts, into the local internal frame of reference of the GL to obtain a mapping of the observation data to the set of local cell grids of the control points.

9. The method of claim 8, further comprising:

concatenating individual cell grids of the control points to form a data representation of a rectified overall cell grid defining the local internal frame of reference of the GL, in which the individual cell grids of the control points are arranged in an aligned rectified manner in a sequence corresponding to a sequence of the control points along the GL.

10. The method of claim 9, wherein the evaluation of the mapped earth observation data is performed based on a representation of the earth observation data as mapped to the rectified overall cell grid.

11. The method of claim 8, wherein at least one of the local cell grids is defined such that the at least one of the local cell grids has one or more of the following properties:

anisotropic arrangement of at least a subset of cells within the at least one of the local cell grids;

the widths or heights or distances of the cells vary among at least a subset of the cells within the at least one of the local cell grids; and an orientation of at least a subset of the cells within the at least one of the local cell grids is aligned to a local orientation of the GL according to a geo-referenced reference geometry at the control point corresponding to the at least one of the local cell grids.

12. The method of claim 8, wherein:

the geo-referenced earth observation data represents one or more image point values per image point of an original image point distribution covering the at least one of the imagery layers; and geometrically transforming the geo-referenced earth observation data comprises determining at least one cell value for each cell of a local cell grid based on an aggregation of a subset of the image point values corresponding to an area of the ROI covered by the cell of the local cell grid.

13. The method of claim 12, wherein aggregating a subset of the image point values comprises one of the following operations:

a) averaging the image point values of all image points being located fully within a corresponding cell of the local cell grid;

b) averaging the image point values of all image points overlapping with an area of the ROI covered by the corresponding cell of the local cell grid, wherein each image point value is weighted according to a size of its overlap with the cell of the local cell grid;

c) weighted averaging of the image point values, wherein image points located closer to a center of the cell of the local cell grid obtain higher weights than image points located more remotely from the center of the cell;

d) determining a median, a minimum and/or a maximum image point values among the image point values covered by the corresponding cell of the local cell grid;

e) determining the image point values representing a specific percentile of a distribution of the image point values within the corresponding cell of the local cell grid;

f) determining one or more of a range, a standard deviation, a variance or any other higher order function capturing characteristics of the distribution of image point values within the cell of the local cell grid; and g) determining a histogram representing the distribution of image point values within the cell of the local cell grid.

14. The method of claim 8, wherein:

at least one of the local cell grids is defined by a set of grid parameters; and the method further comprises determining at least one of the grid parameters based on a process involving machine-learning in connection with cross-validating per supervised learning intermediate results of evaluation data obtained during the machine-learning process with reference parameter data representing known correct classifications of related one or more properties of the GL or of its surroundings according to said one or more conditions.

15. The method of claim 7, wherein acquiring the geo-referenced earth observation data comprises one or more of the following:

acquiring the geo-referenced earth observation data representing one or more of the imagery layers, each of the imagery layers representing imagery covering the ROI in a respective different spectral range of an electromagnetic spectrum;

acquiring the geo-referenced earth observation data representing one or more data layers as further imagery layers, each of the one or more data layers representing respective sensory measurements or predictions of one or more local conditions of the GL or its surroundings within the ROI; and acquiring the geo-referenced earth observation data representing one or more preprocessed imagery layers resulting from a combination of two or more of the one or more of the imagery layers or the one or more data layers.

16. The method of claim 15, wherein the one or more data layers representing respective sensory measurements of the one or more local conditions of the GL or its surroundings within the ROI represent one or more of the following:

precipitation;

intensity or wavelength of local radiation;

temperature;

air pressure;

wind force or direction;

if, at least in one section of the ROI, the GL is a water-based GL: speed and direction of water flow;

if, at least in one section of the ROI, the GL is a land-based GL that is accessible to a land-based vehicle: vibration, orientation, speed, acceleration or any other vehicle parameter measured by one or more vehicle-based sensors that may provide insight on particular conditions of a transport line;

if the GL is the transport line: a transport line usage frequency, a transport line maintenance status or a time since a last maintenance interval, an age, or a constitution of a transport line surface;

climate zone, climate profiles, expected temperatures, or precipitations:

susceptibility towards unexpected events such as accidents, natural disasters, floods, landslides, avalanches, storm damages, tornados, hurricanes, typhoons; and electromagnetic fields.

17. The method of claim 7, further comprising aligning a geometry of the GL in the one or more imagery layers as represented by the geo-referenced earth observation data with a geo-referenced reference geometry of the GL to form a combined imagery stack, wherein at least two of the one or more imagery layers are incorporated into the imagery stack, each of the at least two of the one or more imagery layers representing a digital image in a given spatial resolution, wherein the spatial resolutions of at least two of the one or more imagery layers differ from each other, at least in one overlapping region, thus yielding a combined multi-resolution imagery stack.

18. The method of claim 7, further comprising performing one or more of the following operations based on the evaluation data:

determining a navigation or information output of a vehicle navigation system;

controlling a dynamic traffic sign;

adjusting one or more configurable technical parameters of a vehicle or other transport system;

triggering a maintenance process or an inspection process with respect to the GL which is a process that is fully or partly automated, and/or by causing a related signaling to inform maintenance personnel accordingly; and forecasting a future condition of the GL or its surroundings.

19. A data processing system being configured to perform the method of claim 1.

20. A non-transitory computer-readable medium encoded with a computer program, comprising instructions, which when executed on one or more processors of a data processing system cause the system to perform the method according claim 1.

* * * * *